US012668268B2

(12) United States Patent
Fink et al.

(10) Patent No.: US 12,668,268 B2
(45) Date of Patent: Jun. 30, 2026

(54) MULTISENSORY GESTURAL-AUDIO INTERFACE TO PROMOTE SITUATIONAL AWARENESS FOR IMPROVED AUTONOMOUS VEHICLE CONTROL

(71) Applicant: TOYOTA RESEARCH INSTITUTE, INC., Los Altos, CA (US)

(72) Inventors: Paul D. S. Fink, Hampden, ME (US); Emily Sarah Sumner, Berkeley, CA (US); Velin Dimitrov, Arlington, MA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 201 days.

(21) Appl. No.: 18/092,811

(22) Filed: Jan. 3, 2023

(65) Prior Publication Data

US 2024/0217539 A1    Jul. 4, 2024

(51) Int. Cl.
*B60W 60/00*        (2020.01)
*B60K 35/10*        (2024.01)
*B60W 50/08*        (2020.01)
*B60W 50/14*        (2020.01)

(52) U.S. Cl.
CPC ........... *B60W 60/001* (2020.02); *B60K 35/10* (2024.01); *B60W 50/085* (2013.01); *B60W 50/14* (2013.01); *B60K 2360/1464* (2024.01); *B60W 2540/00* (2013.01)

(58) Field of Classification Search
CPC .... B60W 60/01; B60W 50/085; B60W 50/14; B60W 2540/00; B60K 35/10; B60K 2360/1464
See application file for complete search history.

(56) References Cited

U.S. PATENT DOCUMENTS

| | | | |
|---|---|---|---|
| 9,064,420 | B2 | 6/2015 | Beckwith et al. |
| 2013/0063336 | A1 | 3/2013 | Sugimoto et al. |
| 2014/0282161 | A1 | 9/2014 | Cash |

(Continued)

FOREIGN PATENT DOCUMENTS

| | | | |
|---|---|---|---|
| CN | 208956303 U | * | 6/2019 |
| DE | 102020121668 A1 | | 2/2022 |

(Continued)

OTHER PUBLICATIONS

Xu, Shuang. "Improving Accessibility Design on Touchscreens." Interacción (2015).

*Primary Examiner* — David P. Merlino
(74) *Attorney, Agent, or Firm* — SEYFARTH SHAW LLP

(57) ABSTRACT
A method for a multisensory gestural-audio interface system is described. The method includes providing a high-level overview of a driving environment to a driver of an ego vehicle through non-visual communication. The method also includes scanning a vehicle cabin to detect a gesture of the driver in response to the high-level overview of the driving environment. The method further includes providing a non-visual description of a selected vehicle control object according to the detected gesture of the driver. The method also includes performing a vehicle control action based on the selected vehicle control object based on a confirmation from the driver to perform the vehicle control action.

17 Claims, 13 Drawing Sheets

(56) References Cited

U.S. PATENT DOCUMENTS

| 2015/0193197 | A1* | 7/2015 | Nahman | G06F 3/011 |
| | | | | 715/716 |
| 2016/0107570 | A1* | 4/2016 | Modarres | B62D 15/029 |
| | | | | 340/435 |
| 2016/0174010 | A1* | 6/2016 | Mohammad | H04S 7/302 |
| | | | | 381/302 |
| 2018/0072323 | A1* | 3/2018 | Gordon | B60W 30/095 |
| 2019/0220010 | A1* | 7/2019 | Leonard | B60W 50/14 |
| 2020/0057487 | A1* | 2/2020 | Sicconi | G06F 3/011 |
| 2020/0307618 | A1* | 10/2020 | Yoshizawa | B60W 50/14 |
| 2020/0338981 | A1* | 10/2020 | Moon | G05D 1/227 |
| 2021/0165555 | A1 | 6/2021 | Holz et al. | |
| 2021/0278909 | A1* | 9/2021 | Helot | G06F 3/0425 |
| 2023/0128104 | A1* | 4/2023 | Nice | B60Q 9/008 |
| | | | | 340/686.1 |
| 2024/0112599 | A1* | 4/2024 | Moskowitz | B64U 10/13 |
| 2024/0140468 | A1* | 5/2024 | Miura | H04S 7/30 |
| 2024/0184367 | A1* | 6/2024 | Grenold Loy Dsa | B25J 13/025 |

FOREIGN PATENT DOCUMENTS

| IN | 202141027189 | A | 7/2021 |
| KR | 101709129 | B1 | 2/2017 |

* cited by examiner

600

620-7

620-6

620-5

650

620-4

610-3

610

620-2

620-1

850

Gesture Examples:

1. If user wants more detail: Scanning gesture

860

2. If user wants more information: Selection gesture

870

3. If user wants to make a decision: Decision gesture

880

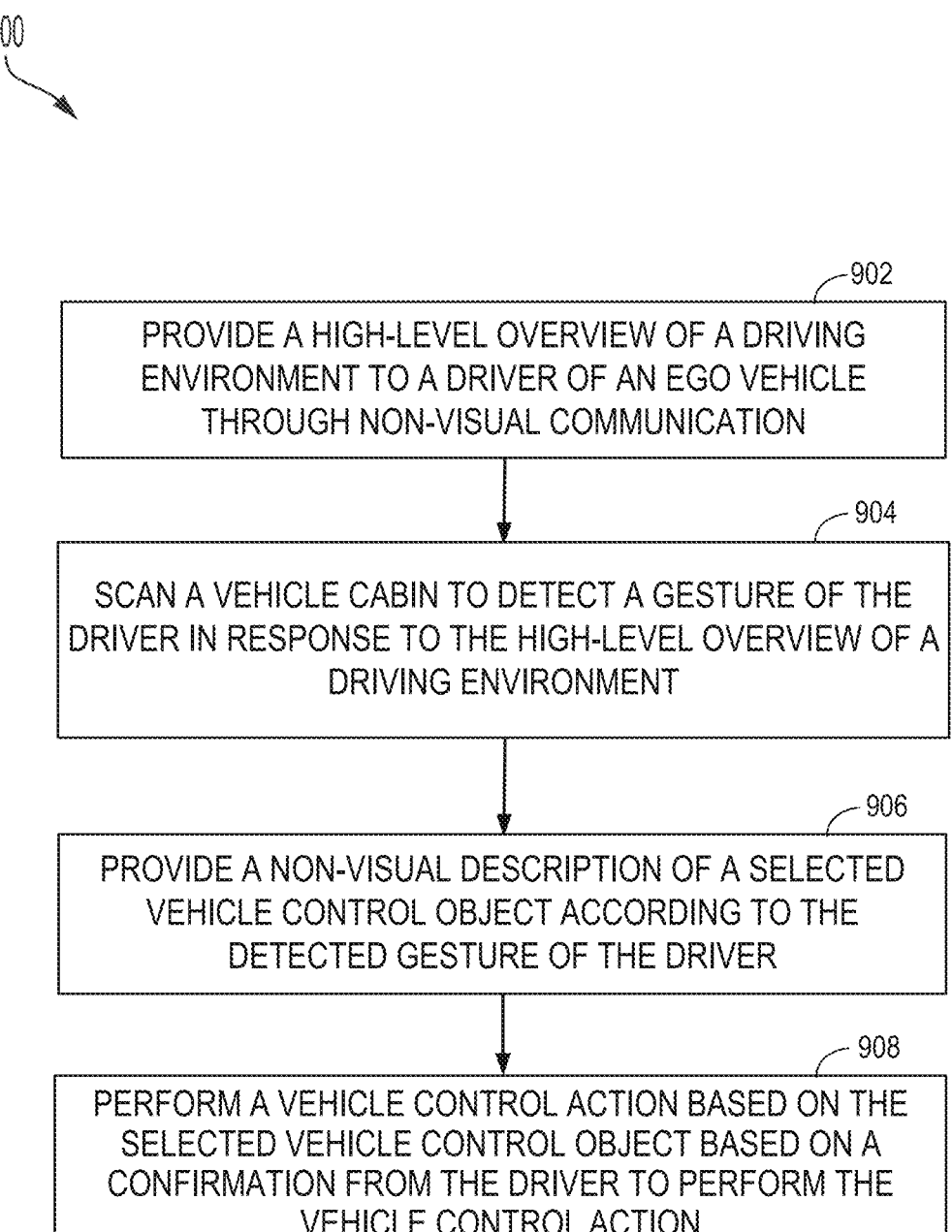

900

902

PROVIDE A HIGH-LEVEL OVERVIEW OF A DRIVING
ENVIRONMENT TO A DRIVER OF AN EGO VEHICLE
THROUGH NON-VISUAL COMMUNICATION

904

SCAN A VEHICLE CABIN TO DETECT A GESTURE OF THE
DRIVER IN RESPONSE TO THE HIGH-LEVEL OVERVIEW OF A
DRIVING ENVIRONMENT

906

PROVIDE A NON-VISUAL DESCRIPTION OF A SELECTED
VEHICLE CONTROL OBJECT ACCORDING TO THE
DETECTED GESTURE OF THE DRIVER

908

PERFORM A VEHICLE CONTROL ACTION BASED ON THE
SELECTED VEHICLE CONTROL OBJECT BASED ON A
CONFIRMATION FROM THE DRIVER TO PERFORM THE
VEHICLE CONTROL ACTION

*FIG. 9*

MULTISENSORY GESTURAL-AUDIO INTERFACE TO PROMOTE SITUATIONAL AWARENESS FOR IMPROVED AUTONOMOUS VEHICLE CONTROL

BACKGROUND

Field

Certain aspects of the present disclosure generally relate to autonomous vehicle technology and, more particularly, to multisensory gestural-audio interface to promote situational awareness for improved autonomous vehicle control.

Background

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number.

These different levels of autonomous vehicles may provide a safety system that improves driving of a vehicle. For example, in a Level 5 vehicle, the set of advanced driver assistance system (ADAS) features installed in a vehicle provide complete vehicle control. In particular, a level 5 or fully autonomous vehicles (FAVs) hold enormous potential to transform mobility for millions of blind and visually impaired (BVI) individuals worldwide. Nevertheless, BVI individuals will desire being "in the loop" of vehicle control. Whether it is personalizing the vehicle's driving style (e.g., speed or following distance), giving input on where to be dropped off, or even changing the route entirely, a human-machine-interface (HMI) that provides BVI individuals with some sense of control over the vehicle behavior is desired.

SUMMARY

A method for a multisensory gestural-audio interface system is described. The method includes providing a high-level overview of a driving environment to a driver of an ego vehicle through non-visual communication. The method also includes scanning a vehicle cabin to detect a gesture of the driver in response to the high-level overview of the driving environment. The method further includes providing a non-visual description of a selected vehicle control object according to the detected gesture of the driver. The method also includes performing a vehicle control action based on the selected vehicle control object based on a confirmation from the driver to perform the vehicle control action.

A non-transitory computer-readable medium having program code recorded thereon for a multisensory gestural-audio interface system is described. The program code is executed by a processor. The non-transitory computer-readable medium includes program code to provide a high-level overview of a driving environment to a driver of an ego vehicle through non-visual communication. The non-transitory computer-readable medium also includes program code to scan a vehicle cabin to detect a gesture of the driver in response to the high-level overview of the driving environment. The non-transitory computer-readable medium further includes program code to provide a non-visual description of a selected vehicle control object according to the detected gesture of the driver. The non-transitory computer-readable medium also includes program code to perform a vehicle control action based on the selected vehicle control object based on a confirmation from the driver to perform the vehicle control action.

A system for a multisensory gestural-audio interface system is described. The system includes a non-visual environment overview module to provide a high-level overview of a driving environment to a driver of an ego vehicle through non-visual communication. The system also includes a gesture tracking module to scan a vehicle cabin to detect a gesture of the driver in response to the high-level overview of the driving environment. The system further includes a vehicle control selection module to provide a non-visual description of a selected vehicle control object according to the detected gesture of the driver. The system also includes a vehicle control action module to perform a vehicle control action based on the selected vehicle control object based on a confirmation from the driver to perform the vehicle control action.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 9 is a flowchart illustrating a method for a multisensory gestural-audio interface system, according to aspects of the present disclosure.

DETAILED DESCRIPTION

Figure 1:
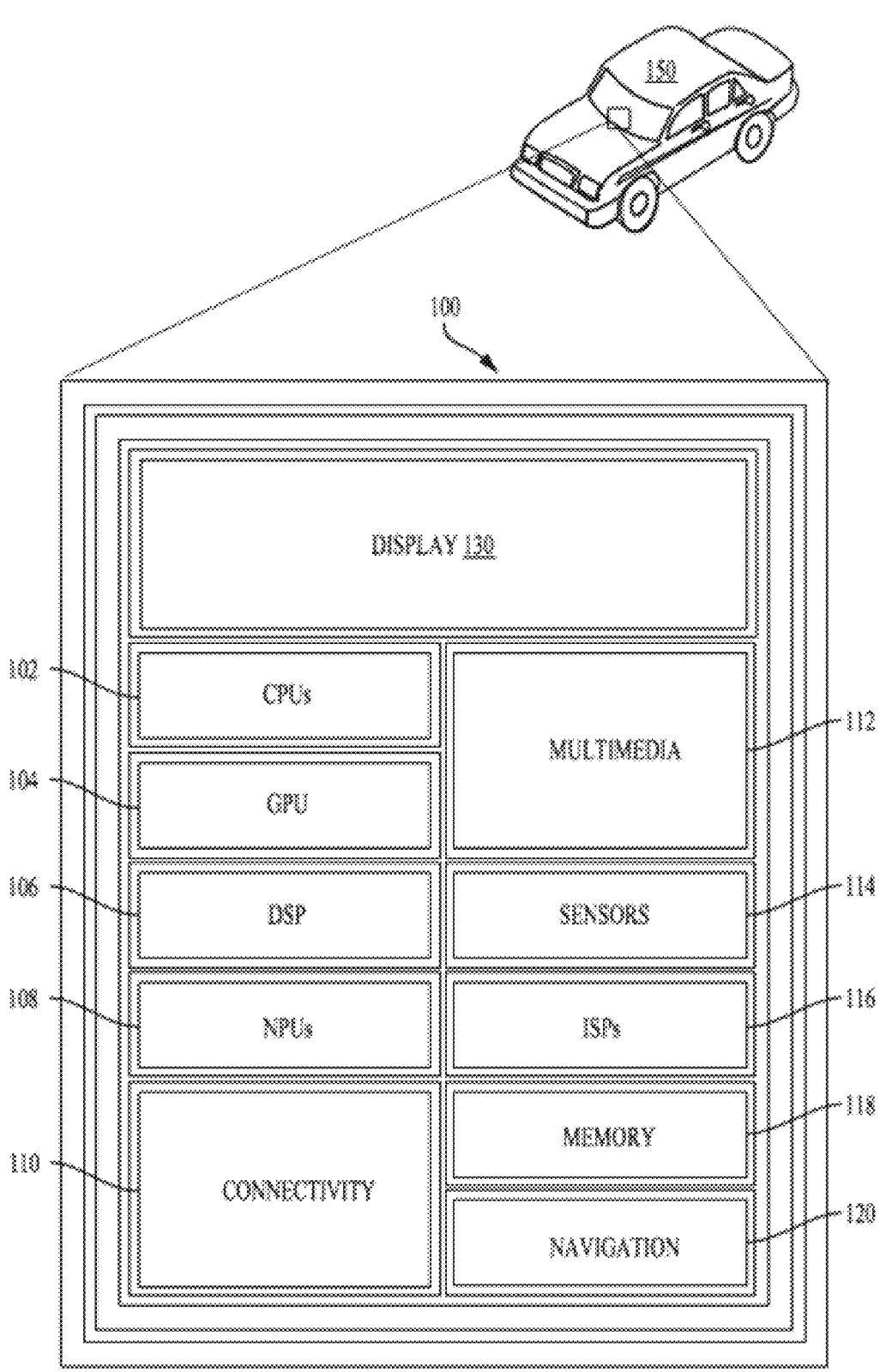
FIG. 1 illustrates an example implementation of designing a neural network using a system-on-a-chip (SOC) for a multisensory gestural-audio interface system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The National Highway Traffic Safety Administration ("NHTSA") has defined different "levels" of autonomous vehicles (e.g., Level 0, Level 1, Level 2, Level 3, Level 4, and Level 5). These different levels of autonomous vehicles may provide a safety system that improves driving of a vehicle. For example, in a Level 5 vehicle, the set of advanced driver assistance features installed in a vehicle provide complete vehicle control. Interaction with the set of autonomous features available from a vehicle generally involves a human-machine-interface (HMI).

Fully autonomous vehicles (FAVs) hold enormous potential to transform mobility for individuals that are blind and visually impaired (BVI). Today, BVI individuals rely on others for transportation, either through friends, family, public transportation, or rideshare. FAVs that are accessibly designed hold the potential for enabling independent travel among BVI individuals, thus resulting in more mobility and personal autonomy. Nevertheless, fully realizing independence and autonomy for BVI individuals involves being "in the loop" of vehicle control. Whether it is personalizing the vehicle's driving style (e.g., speed or following distance), giving input on where to be dropped off, or even changing the route entirely, a human-machine-interface (HMI) that provides BVI individuals with some sense of control over the vehicle behavior is desired.

Although FAV control for BVI individuals is a promising goal, situational awareness based on information access to the surrounding environment and driving context is a prerequisite. In particular, an inclusive FAV is designed to increase understanding of the vehicle's decision making process as well as to give details about the surrounding environment. That is, situational awareness is an important factor to independence because it increases understanding of the driving environment, such that actionable behavior and control are possible across the trip (e.g., for route planning). A BVI interface with multimodal input-output processes for supporting distributed cognitive load across the senses and fewer demands on working memory is desired. Nevertheless, despite being proposed for use in FAVs, a BVI that conveys situational awareness, while harnessing the benefits of multimodality, is desired.

Some aspects of the present disclosure are directed to situational awareness and hierarchical information access in autonomous vehicles, while also promoting vehicle control for blind and visually impaired individuals. Individuals with moderate to severe vision loss have indicated wanting more control over what information is displayed to them in the driving environment to enable choice selection throughout a trip (e.g., route selection or where to stop). Some aspects of the present disclosure couple haptic feedback representations, gestural recognition, and spatialized audio to provide a multisensory and accessible system through which objects in a driving environment can be understood, selected, and navigated for visually impaired individuals. Some aspects of the present disclosure also enable individuals (regardless of visual status) to intuitively select objects or points of interest in a driving environment and receive more about the selected object and/or points of interest in a driving environment.

Some aspects of the present disclosure are directed to a multisensory gestural-audio interface system for providing driving information through multiple senses for reducing cognitive load and working memory demands. The multisensory gestural-audio interface system enables design of inclusive and accessible, fully autonomous vehicles (FAVs). The multisensory gestural-audio interface system beneficially provides for millions of individuals experiencing transportation-limiting disabilities (e.g., visual impairment) worldwide. Additionally, the multisensory gestural-audio interface system enables non-visually dependent hierarchical access to driving information, which not only gives users autonomy over what information they want to hear and when, but also enables input into driving decisions. By designing this information flow through multiple senses, the multisensory gestural-audio interface system provides strong implications for reducing cognitive load and working memory demands.

Some aspects of the present disclosure are directed to a user-driven, multisensory interface for increasing situational awareness and control in automated vehicles. This system is designed to serve both BVI people who have previously operated traditional vehicles, as well as people who have never driven before, representing broad and inclusive usability across the spectrum of vision loss.

FIG. 1 illustrates an example implementation of the aforementioned system and method for a multisensory gestural-audio interface system using a system-on-a-chip (SOC) 100 of a vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to a multisensory gestural-audio interface system based a sensor of a driver cabin processed by the sensor processor 114.

The instructions loaded into a processor (e.g., CPU 102 or NPU 108) may also include program code to provide a multisensory gestural-audio interface system. The instructions loaded into a processor (e.g., NPU 108) may also include program code to provide a high-level overview of a driving environment to a driver of a vehicle through non-visual communication. The instructions loaded into a processor (e.g., NPU 108) may also include program code to scan a vehicle cabin to detect a gesture of the driver in response to the high-level overview of a driving environment. The instructions loaded into a processor (e.g., NPU 108) may also include program code to provide a non-visual description of a selected vehicle control object according to the detected gesture of the driver. The instructions loaded into a processor (e.g., NPU 108) may also include program code to perform a vehicle control action based on the selected vehicle control action based on a gesture confirmation from the driver to perform the vehicle control action.

Figure 2:
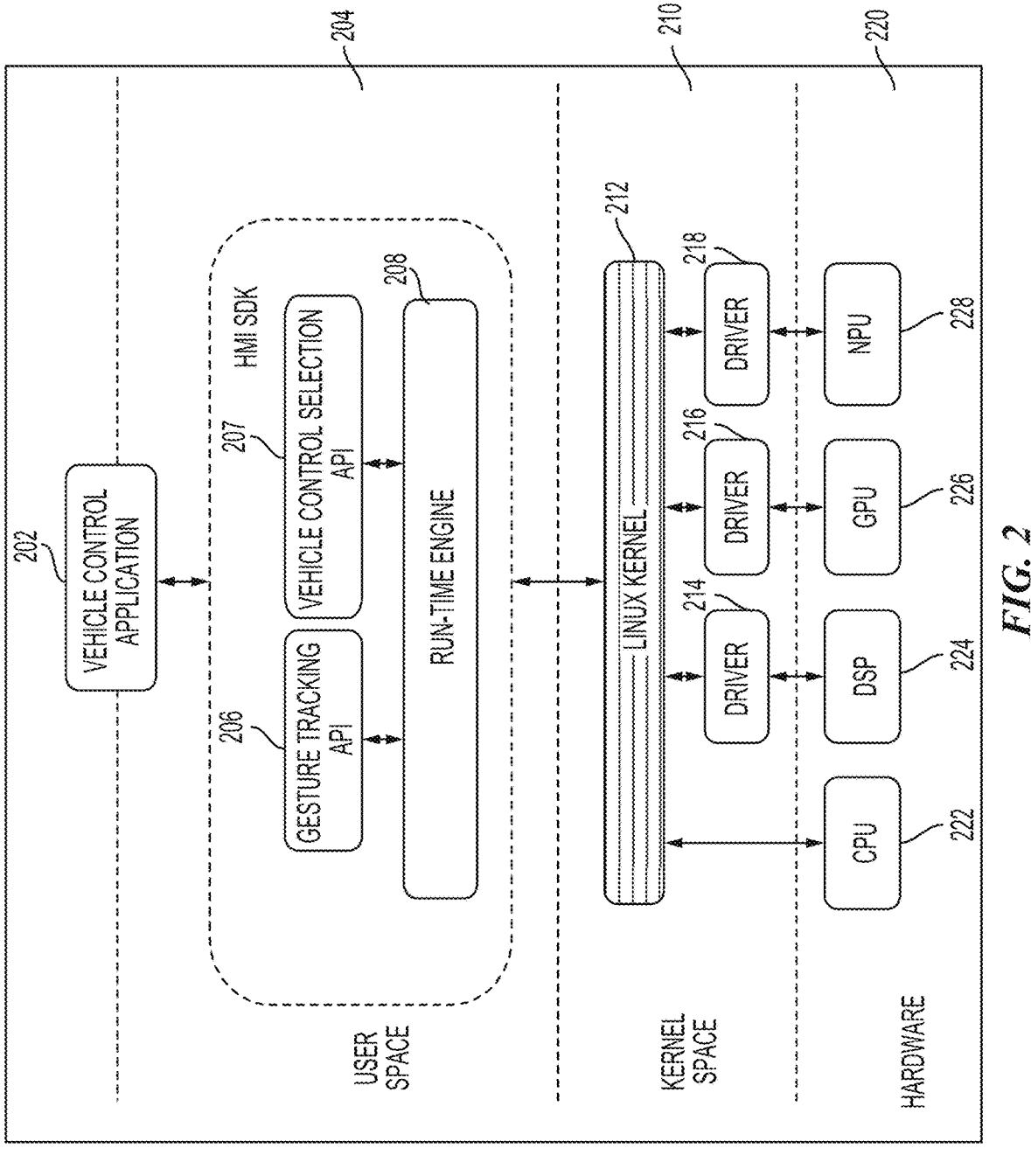
FIG. 2 is a block diagram illustrating a software architecture that may modularize artificial intelligence (AI) functions for a multisensory gestural-audio interface system of an autonomous agent, according to aspects of the present disclosure.

FIG. 2 is a block diagram illustrating a software architecture 200 that may modularize artificial intelligence (AI) functions for a multisensory gestural-audio interface system of an autonomous agent, according to aspects of the present disclosure. Using the architecture, a vehicle control application 202 may be designed such that it may cause various processing blocks of a system-on-a-chip (SOC) 220 (for example a CPU 222, a DSP 224, a GPU 226, and/or an NPU 228) to perform supporting computations during run-time operation of the vehicle control application 202. While FIG. 2 describes the software architecture 200 for multisensory gestural-audio interface for the blind and visually impaired (BVI), it should be recognized that multisensory gestural-audio interface features are not limited to autonomous agents. According to aspects of the present disclosure, an attention-based agent interaction system is applicable to any vehicle type, provided the vehicle is equipped with appropriate functions of an advanced driver assistance system (ADAS).

The vehicle control application 202 may be configured to call functions defined in a user space 204 that may, for example, provide for vehicle interface control services. The vehicle control application 202 may make a request to compile program code associated with a library defined in a gesture tracking application programming interface (API) 206 to scan a vehicle cabin to detect a gesture of a driver in response to a high-level overview of a driving environment provided to the driver using a non-visual description. The vehicle control application 202 may also make a request to compile program code associated with a library defined in a vehicle control selection API 207 to perform a vehicle control action based on a selected vehicle control action by the driver based on a gesture confirmation from the driver to perform the selected vehicle control action.

A run-time engine 208, which may be compiled code of a runtime framework, may be further accessible to the vehicle control application 202. The vehicle control application 202 may cause the run-time engine 208, for example, to take actions for communicating with a vehicle operator. When the vehicle operator begins to interact with a vehicle interface, the run-time engine 208 may in turn send a signal to an operating system 210, such as a Linux Kernel 212, running on the SOC 220. FIG. 2 illustrates the Linux Kernel 212 as software architecture for implementing driver gesture tracking features for performing control of the vehicle. It should be recognized, however, aspects of the present disclosure are not limited to this exemplary software architecture. For example, other kernels may be used to provide the software architecture to support the multisensory gestural-audio interface functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
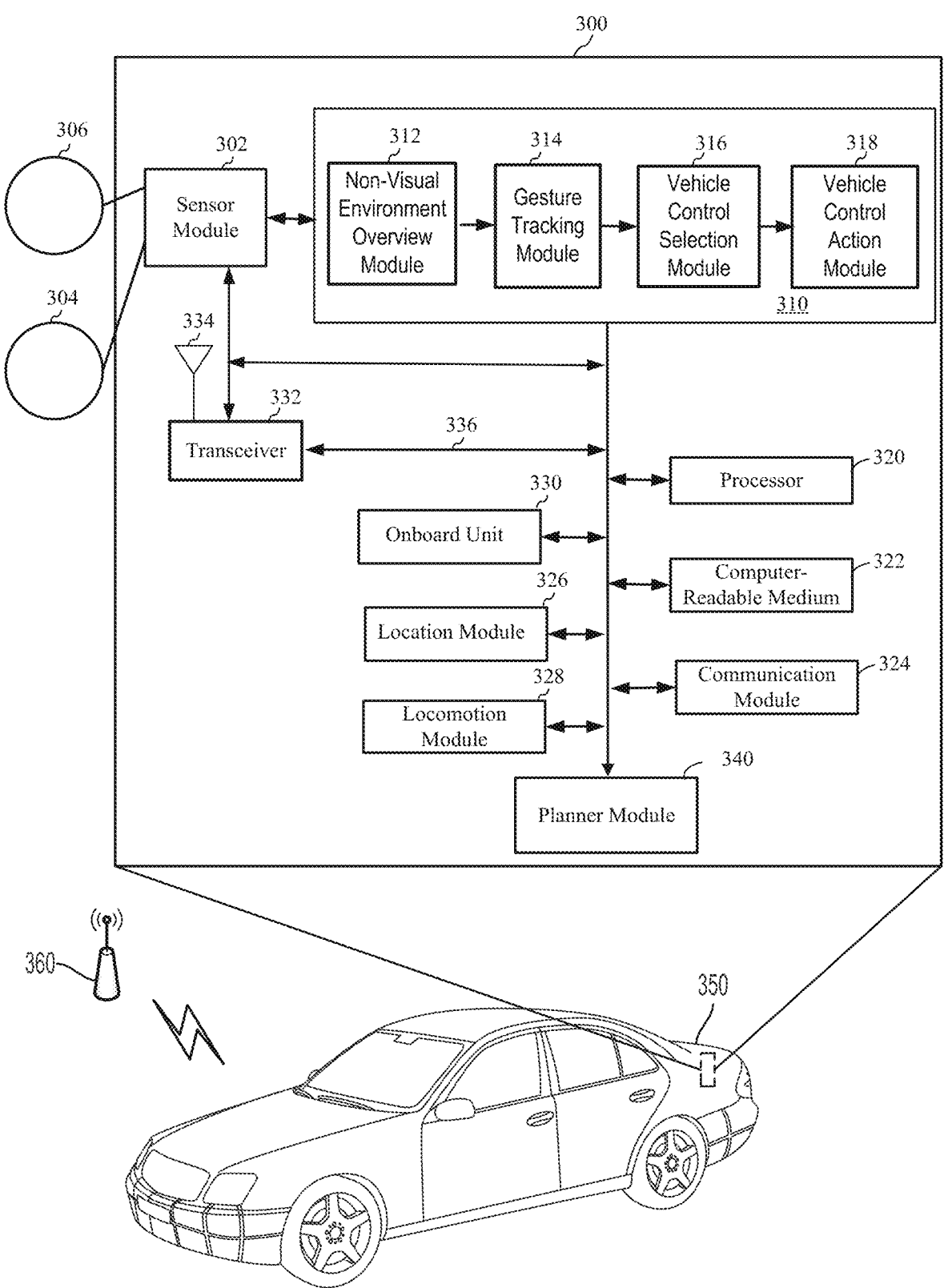
FIG. 3 is a diagram illustrating an example of a hardware implementation for a multisensory gestural-audio interface system, according to aspects of the present disclosure.

FIG. 3 is a diagram illustrating an example of a hardware implementation for a multisensory gestural-audio interface system 300, according to aspects of the present disclosure. The multisensory gestural-audio interface system 300 may be configured to perform a vehicle control action of a car 350 based on a selected vehicle control action by a driver of the car 350 in response to a confirmation gesture from the driver to perform the selected vehicle control action. The multisensory gestural-audio interface system 300 may be a component of a vehicle, a robotic device, or other non-autonomous device (e.g., non-autonomous vehicles). For example, as shown in FIG. 3, the multisensory gestural-audio interface system 300 is a component of the car 350.

The multisensory gestural-audio interface system 300 may be implemented with an interconnected architecture, represented generally by an interconnect 336. The interconnect 336 may include any number of point-to-point interconnects, buses, and/or bridges depending on the specific application of the multisensory gestural-audio interface system 300 and the overall design constraints. The interconnect 336 links together various circuits including one or more processors and/or hardware modules, represented by a sensor module 302, a vehicle controller 310, a processor 320, a computer-readable medium 322, a communication module 324, a location module 326, a locomotion module 328, an onboard unit 330, and a planner module 340. The interconnect 336 may also link various other circuits such as timing sources, peripherals, voltage regulators, and power management circuits, which are well known in the art, and therefore, will not be described any further.

The multisensory gestural-audio interface system 300 includes a transceiver 332 coupled to the sensor module 302, the vehicle controller 310, the processor 320, the computer-readable medium 322, the communication module 324, the location module 326, the locomotion module 328, the onboard unit 330, and the planner module 340. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle controller 310 to/from connected vehicles within the vicinity of the car 350.

The multisensory gestural-audio interface system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle controller 310 to perform a vehicle control action of the car 350 based on a selected vehicle control action selected by a driver of the car 350 in response to a confirmation gesture from the driver to perform the selected vehicle control action using any of the modules (e.g., 302, 310, 324, 326, 328, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images of the vehicle operator. The second sensor 304 may be a ranging sensor, such as a light detection and ranging (LIDAR) sensor or a radio detection and ranging (RADAR) sensor for capturing an external vehicle environment. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle controller 310, the communication module 324, the location module 326, the locomotion module 328, the onboard unit 330, and/or the planner module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 326 may determine a location of the car 350. For example, the location module 326 may use a global positioning system (GPS) to determine the location of the car 350. The location module 326 may implement a dedicated short-range communication (DSRC)-compliant GPS unit. A DSRC-compliant GPS unit includes hardware and software to make the car 350 and/or the location module 326 compliant with one or more of the following DSRC standards, including any derivative or fork thereof: EN 12253:2004 Dedicated Short-Range Communication-Physical layer using microwave at 5.8 GHz (review); EN 12795: 2002 Dedicated Short-Range Communication (DSRC)-DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fee Collection-Application interface.

The communication module 324 may facilitate communications via the transceiver 332. For example, the communication module 324 may be configured to provide communication capabilities via different wireless protocols, such as 6G, 5G NR, Wi-Fi, long term evolution (LTE), 4G, 3G, etc. The communication module 324 may also communicate with other components of the car 350 that are not modules of the multisensory gestural-audio interface system 300. The transceiver 332 may be a communications channel through a network access point 360. The communications channel may include DSRC, 6G, 5G NR, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G NR, 6G, LTE, LTE-V2X, LTE-D2D, VOLTE, or any other mobile data network or combination of mobile data networks. Further, the network access point 360 may include one or more IEEE 802.11 wireless networks.

The multisensory gestural-audio interface system 300 also includes the planner module 340 for planning a route and controlling the locomotion of the car 350, via the locomotion module 328 for autonomous operation of the car 350. In one configuration, the planner module 340 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle controller 310 may be in communication with the sensor module 302, the processor 320, the computer-readable medium 322, the communication module 324, the location module 326, the locomotion module 328, the onboard unit 330, the transceiver 332, and the planner module 340. In one configuration, the vehicle controller 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle controller 310 may receive sensor data directly from the first sensor 306 and the second sensor 304 to determine, for example, input traffic data images.

Fully autonomous vehicles (FAVs) hold enormous potential to transform mobility for individuals that are blind and visually impaired (BVI). Today, BVI individuals rely on others for transportation, either through friends, family, public transportation, or rideshare. FAVs that are accessibly designed hold the potential for enabling independent travel among BVI individuals, thus resulting in more mobility and personal autonomy. Nevertheless, fully realizing independence and autonomy for BVI individuals involves being "in the loop" of vehicle control. Whether it is personalizing the vehicle's driving style (e.g., speed or following distance), giving input on where to be dropped off, or even changing the route entirely, a human-machine-interface (HMI) that provides BVI individuals with some sense of control over the vehicle behavior is desired.

Some aspects of the present disclosure are directed to situational awareness and hierarchical information access in autonomous vehicles (e.g., the car 350), while also promoting vehicle control for blind and visually impaired individuals. Individuals with moderate to severe vision loss have indicated wanting more control over what information is displayed to them in the driving environment to enable choice selection throughout a trip (e.g., route selection or where to stop). Some aspects of the present disclosure couple haptic feedback representations, gestural recognition, and spatialized audio to provide a multisensory and accessible system through which objects in a driving environment can be understood, selected, and navigated for visually impaired individuals. Some aspects of the present disclosure also enable individuals (regardless of visual status) to intuitively select objects or points of interest in a driving environment and receive more about the selected object and/or points of interest in a driving environment.

In these aspects of the present disclosure, the multisensory gestural-audio interface system 300 provides driving information to a driver of the car 350 through multiple senses for reducing cognitive load and working memory demands. As shown in FIG. 3, the multisensory gestural-audio interface system 300 includes the vehicle controller 310 to provide a human-machine-interface (HMI) by providing a non-visual environment overview module 312 and a gesture tracking module 314, as well as a vehicle control selection module 316, and a vehicle control action module 318. The non-visual environment overview module 312, the gesture tracking module 314, the vehicle control selection module 316, and the vehicle control action module 318 may be components of a same or different artificial neural network, such as a deep convolutional neural network (CNN). The vehicle controller 310 is not limited to a CNN.

In some aspects of the present disclosure, an HMI of the car 350 is provided by the non-visual environment overview module 312 and the gesture tracking module 314. For example, the non-visual environment overview module 312 provides a high-level overview of a driving environment to a driver of the car 350 through non-visual communication. In some aspects of the present disclosure, the non-visual communication of the high-level overview of the driving environment is provided to the driver of the car 350 through haptic representation on a palm of the driver. Additionally, the gesture tracking module 314 receives a data stream from the first sensor 306 and/or the second sensor 304. The data stream may include a 2D RGB image from the first sensor 306 and LIDAR data points from the second sensor 304. The data stream from these sensors may also include a driver facing camera to monitor and/or track gestures of the driver of the car 350 by scanning a cabin of the car 350 to detect a gesture of the driver in response to the high-level overview of the driving environment.

In these aspects of the present disclosure, the vehicle control selection module 316 is configured to provide a non-visual description of a selected vehicle control action according to a detected gesture of the driver. Additionally, the vehicle control action module 318 is configured to perform a vehicle control action of the car 350 based on the selected vehicle control action in response to a gesture confirmation from the driver of the car 350 to perform the vehicle control action.

Figure 4A:
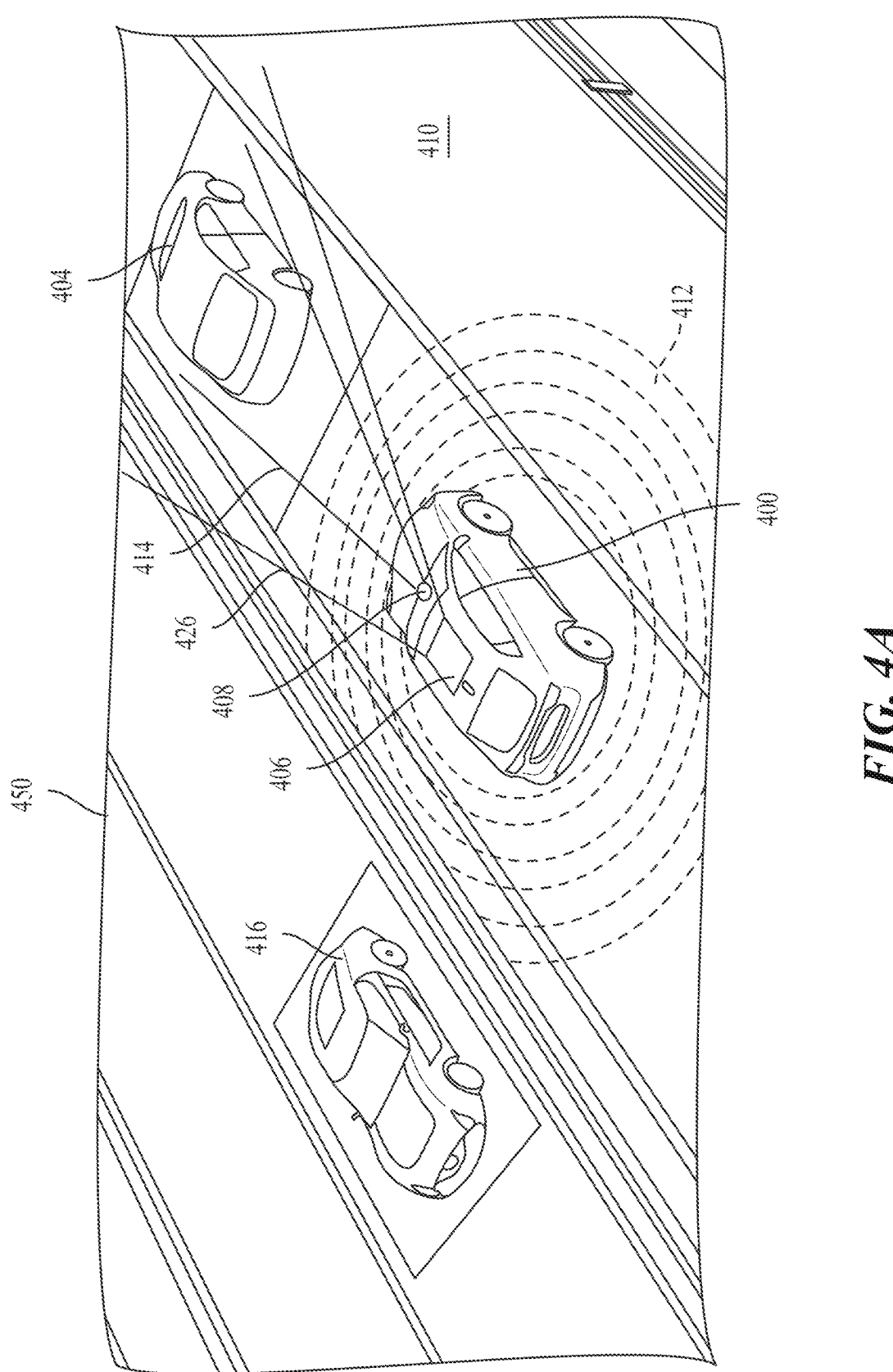
FIGS. 4A-4B are block diagrams illustrating an ego vehicle including a multisensory gestural-audio interface system, according to aspects of the present disclosure.

Various aspects of the present disclosure may be implemented in an agent, such as a vehicle. The vehicle may operate in either an autonomous mode, a semi-autonomous mode, or a manual mode. In some examples, the vehicle may switch between operating modes. FIG. 4A is a diagram illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the sensor module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

Figure 4B:
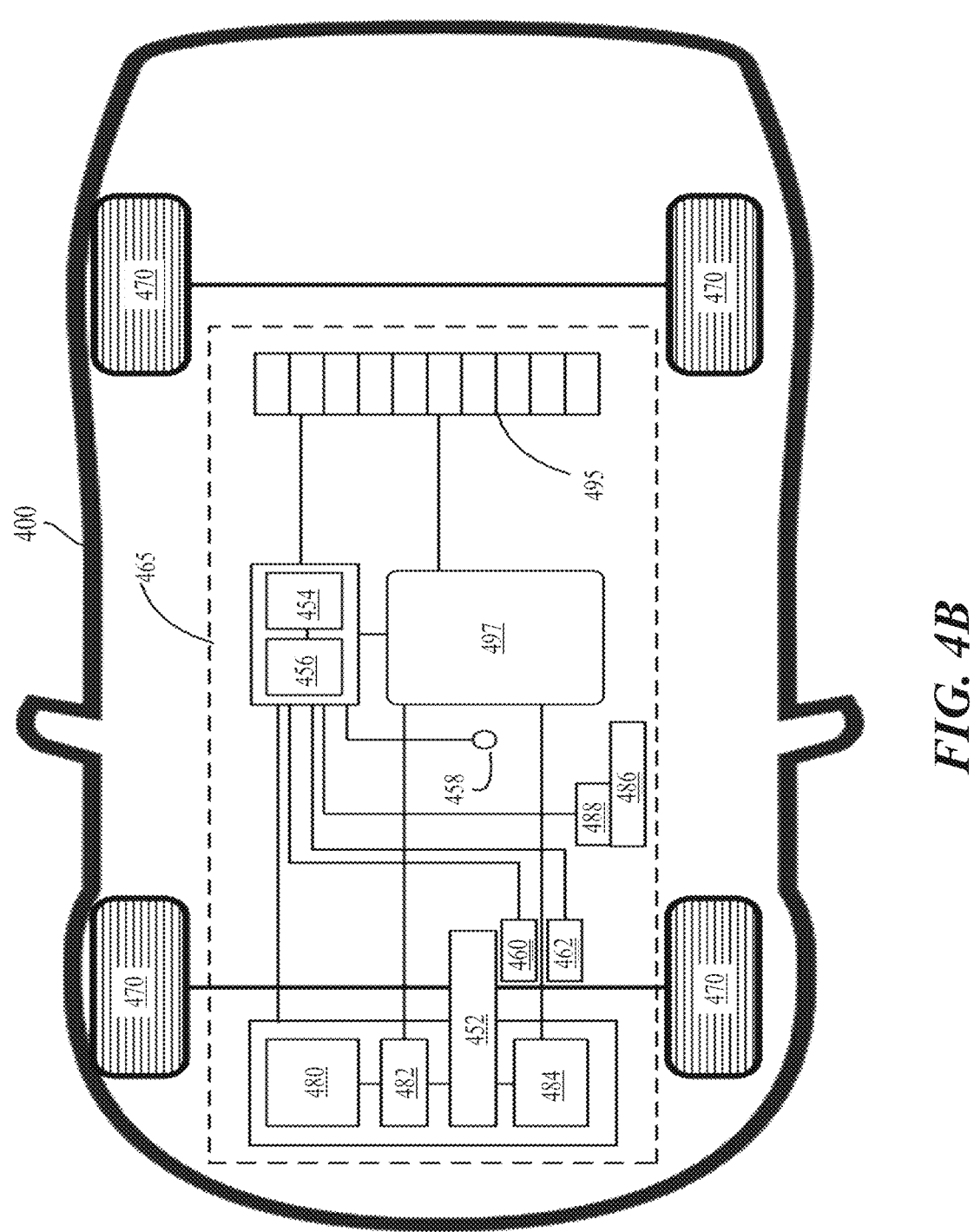

FIG. 4B is a diagram illustrating an example of a vehicle 400, in accordance with various aspects of the present disclosure. It should be understood that various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode, and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power, and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules.

Figure 5:
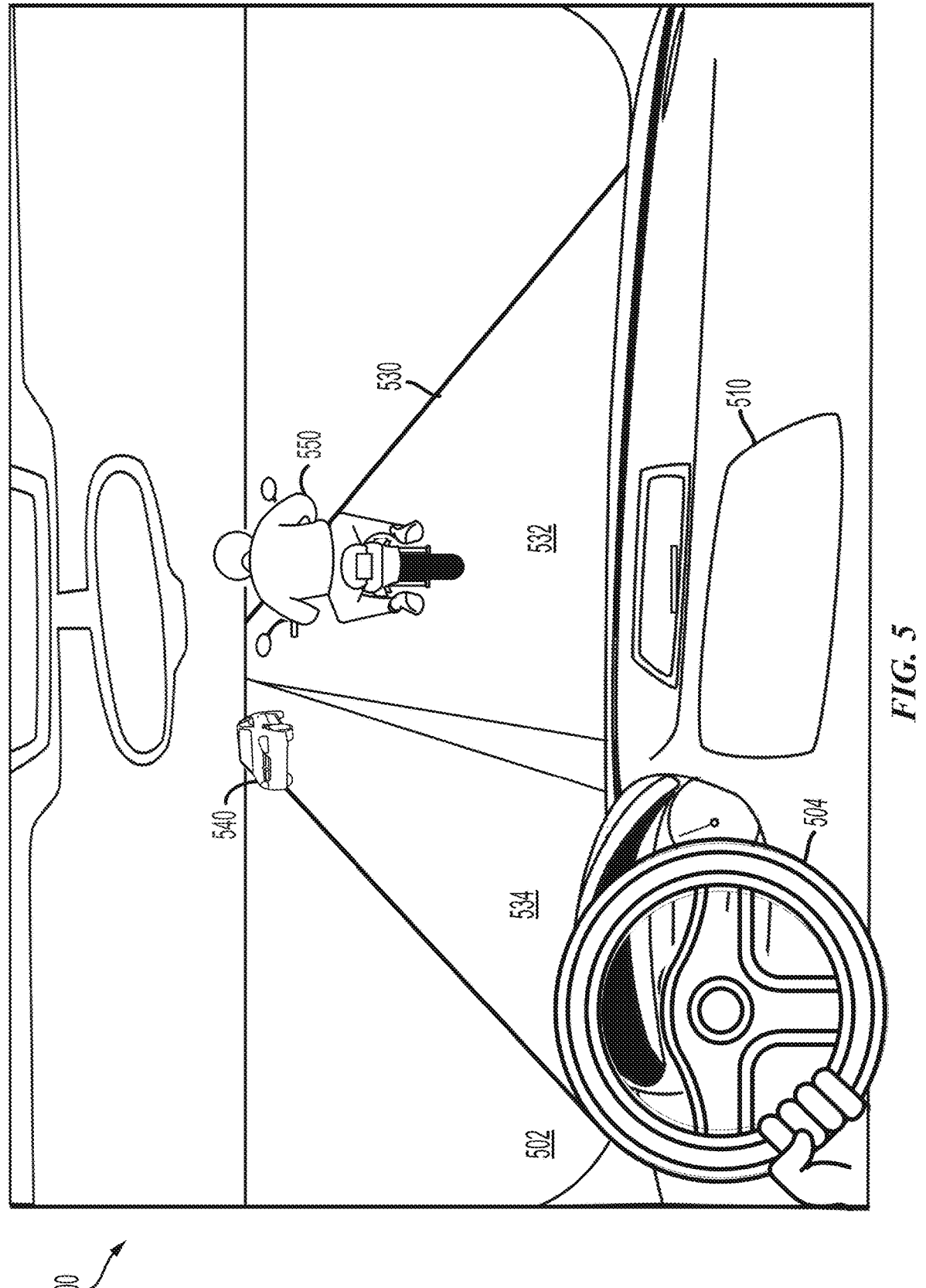
FIG. 5 is a block diagram illustrating operation of a multisensory gestural-audio interface system based on dynamically tracking gestures of a vehicle operator, according to aspects of the present disclosure.

FIG. 5 is a block diagram illustrating operation of a multisensory gestural-audio interface system based on dynamically tracking gestures of a vehicle operator, according to aspects of the present disclosure. FIG. 5 illustrates a cabin of a fully autonomous vehicle (FAV) 500, including a front windshield 502, a steering wheel 504 and a heads-up display (HUD) 510. According to aspects of the present disclosure, the HUD 510 enables the operator of the vehicle to monitor operation of the FAV 500. In this example, the FAV 500 is in a first lane 532 of a roadway 530, including a cycle 550 in the first lane 532 and an on-coming vehicle 540 in a second lane 534 of the roadway 530. As described, the cycle 550 and the on-coming vehicle may be referred to as external road agents.

Although the FAV 500 holds promise for improving efficient transportation without involving intervention, a truly safe and accessible experience enables user input through the HUD 510 for all people, in many scenarios (e.g., to alter a route or pull over during an emergency). Unfortunately, use of the HUD 510 is not feasible for blind and visually impaired (BVI) individuals. Some aspects of the present disclosure are directed to a multisensory gestural-audio interface system for control in the FAV 500 among BVI individuals. In some configurations, the multisensory gestural-audio interface system 300 of FIG. 3 provides strong support for control across a battery of driving tasks, as well as providing multimodal information. Additionally, the design of the multisensory gestural-audio interface system 300 supports a novel multisensory interface leveraging mid-air gestures, audio, and haptics. Benefits of the multisensory gestural-audio interface system 300 include an inclusively designed gesture set for control of the FAV 500, and insight regarding supplemental haptic and audio cues, for example, as shown in FIGS. 6A and 6B.

Figure 6A:
FIGS. 6A and 6B are block diagrams illustrating a multisensory gestural-audio interface system, according to aspects of the present disclosure.
Figure 6B:
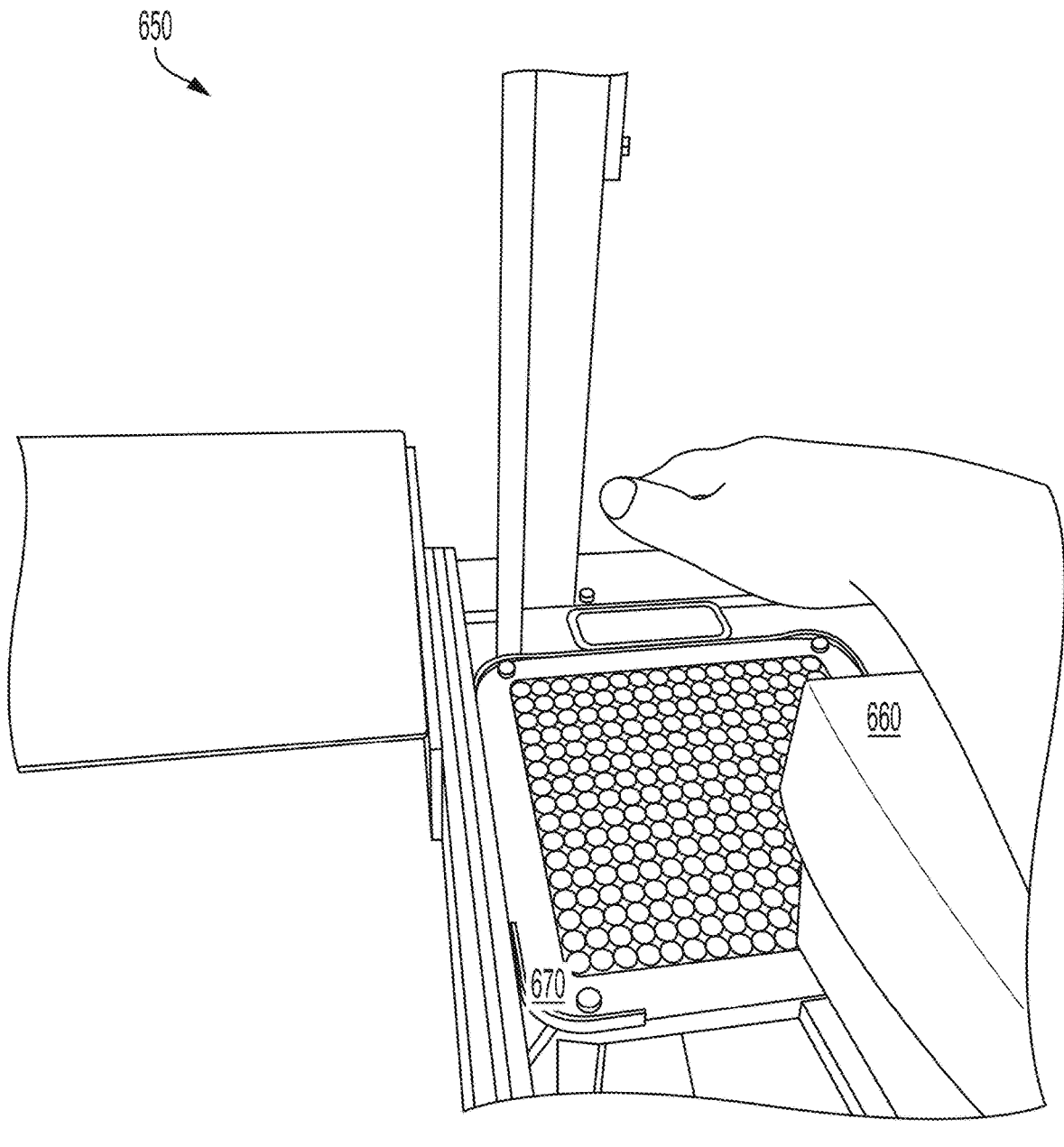

FIGS. 6A and 6B are block diagrams illustrating a multisensory gestural-audio interface system 600, according to aspects of the present disclosure. In some aspects of the present disclosure, the multisensory gestural-audio interface system 600 enables gestural navigation supported by gestural-audio with haptic feedback. The gestural-audio component utilizes a ring 610 of speakers 620 (620-1, . . . , 620-7) that a driver can elicit through hand gestures to hear spatialized information. In this configuration, the ring 610 of speakers 620 (620-1, . . . , 620-7) supports non-visual navigation by providing spatial delivery of auditory information to increase environmental learning and spatial memory, while significantly reducing cognitive load compared to using non-spatialized (traditional) auditory descriptions.

As shown in FIG. 6A, the multisensory gestural-audio interface system 600 is composed of the set of the speakers 620 (620-1, . . . , 620-7) mounted on the ring 610. For example, the speakers 620 (620-1, . . . , 620-7) may be 3" Kicker motorcycle-style speakers, and the ring 610 may be implemented using, for example, a TrakRacer TR160 racing simulator. In this configuration, the ring 610 is designed from slotted extrusion rails for mounting devices in a modular manner around a vehicle seat. In this example, seven channels of audio are generated through an amplifier, and fed to the set of the speakers 620 (620-1, . . . , 620-7) arranged at various clock face positions. For example, the speakers 620 (620-1, . . . , 620-7) may be arranged around the user (e.g., 9 o'clock, 10 o'clock, 11 o'clock, 12 o'clock, 1 o'clock, 2 o'clock, and 3 o'clock). In some aspects of the present disclosure, the clock face positions of the speakers 620 (620-1, . . . , 620-7) are selected based on a frequency of use in training for navigation among BVI individuals.

In some aspects of the present disclosure, audio files played through the set of the speakers 620 (620-1, . . . , 620-7) may be delivered using a software package that maps audio files to specific key strokes on a keyboard. Alternatively, audio cues are triggered using computer vision. Additionally, audio files played through the set of the speakers 620 (620-1, . . . , 620-7) may be created using an AI voice generator. In operation, the multisensory gestural-audio interface system 600 utilizes audio for enabling route changing at an intersection. Alternatively, the multisensory gestural-audio interface system 600 conveys an upcoming intersection to the driver using haptic representations delivered via a haptic modality such as, for example, a mid-air ultrasonic haptics device 650 shown in FIG. 6B.

FIG. 6B is a diagram further illustrating a mid-air ultrasonic haptics device 650 of the multisensory gestural-audio interface system 600 of FIG. 6A, according to aspects of the present disclosure. In some aspects of the present disclosure, the mid-air ultrasonic haptics device 650 provides a haptic component of the multisensory gestural-audio interface system 600 by relying on ultrasonic haptic feedback. In this configuration, the mid-air ultrasonic haptics device 650 supports haptic exploration, which presents advantages in terms of the relative ease at which information can be conveyed with spatial properties, such as lines, contours, and map elements. For example, the mid-air ultrasonic haptics device 650 provides a driver with adequate information to engage in a route alteration task using hand gestures.

The mid-air ultrasonic haptics device 650 may be implemented using an UltraHaptics (UH) device 670, which is a device capable of creating complex, mid-air, haptic sensations. In some aspects of the present disclosure, the ring 610 of speakers 620 (620-1, . . . , 620-7) provides an array of ultrasonic transducers to generate standing waves for creating complex, mid-air, haptic sensations. As shown in FIG. 5, the mid-air ultrasonic haptics device 650 may provide a means of generating haptic sensations to represent abstractions of a street intersection relative to the roadway 530. The mid-air ultrasonic haptics device 650 includes a rest 660, designed to support a forearm during use to enable hovering the hand of the user over the UH device 670 for extended periods without fatigue.

TABLE 1

| Ultrasonic Haptic Sequence Parameters | |
| --- | --- |
| Description (Sequence) | Parameter |
| Double Pulse (1, 3) | 3.33 Hz |
| Intermission (1-2) | 500 ms |
| Line Points (2) | 10 points |
| Line Frequency (2) | 5 Hz |
| Intermission (2-3) | 500 ms |

In operation, the mid-air ultrasonic haptics device 650 may provide a haptic intersection representation using the following sequence and haptic parameters, as noted in Table 1: (1) pulse n-times in the center of the palm indicating the number of roads; (2) draw a line from the center towards the direction of the clock face position; (3) pulse two times at the end of the line; and (4) repeat 1-3 until participant responds. A method for a multisensory gestural-audio interface system is shown in FIG. 7.

Figure 7A:
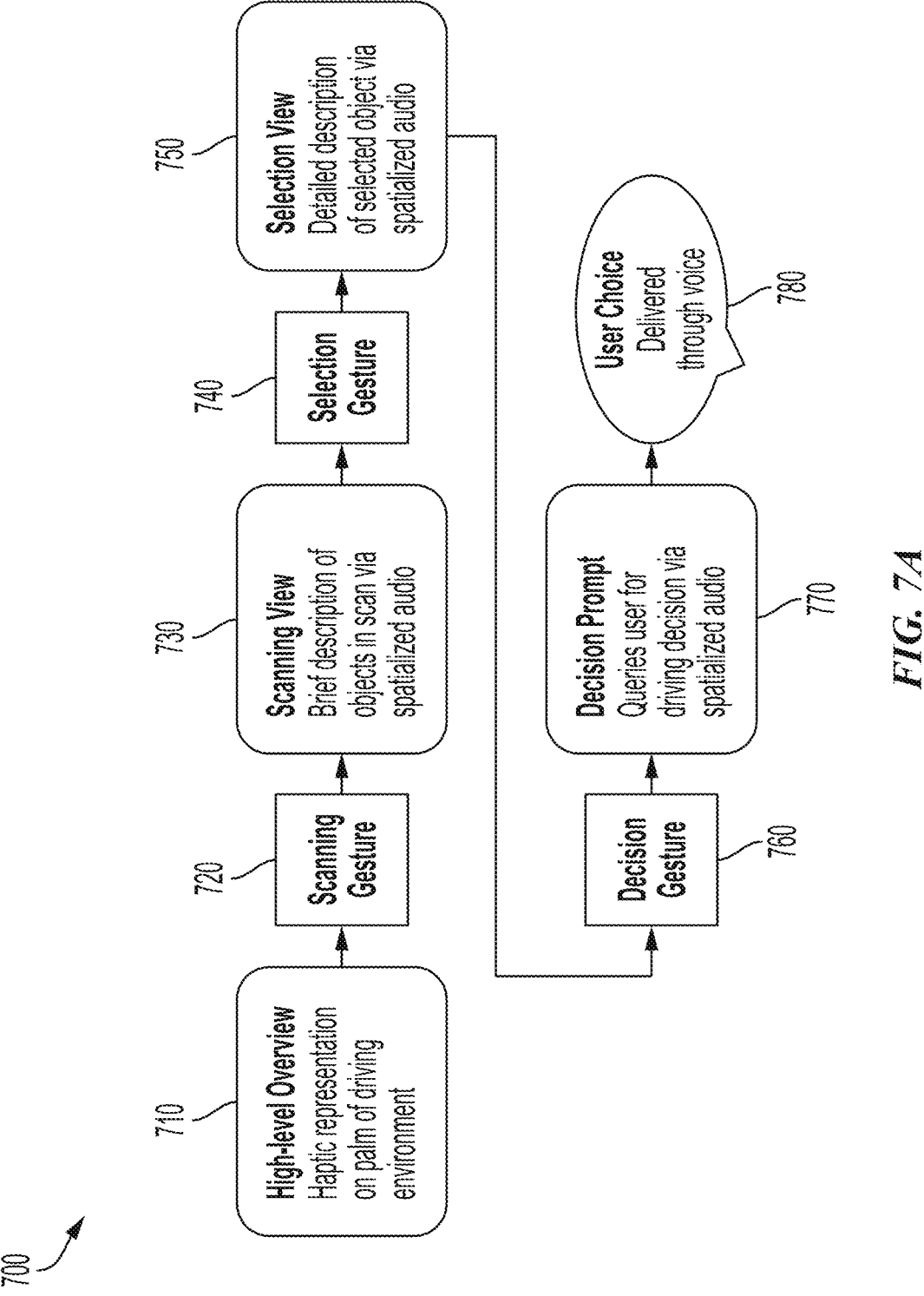
FIGS. 7A and 7B are flowcharts illustrating a method for a multisensory gestural-audio interface system, according to aspects of the present disclosure.
Figure 7B:
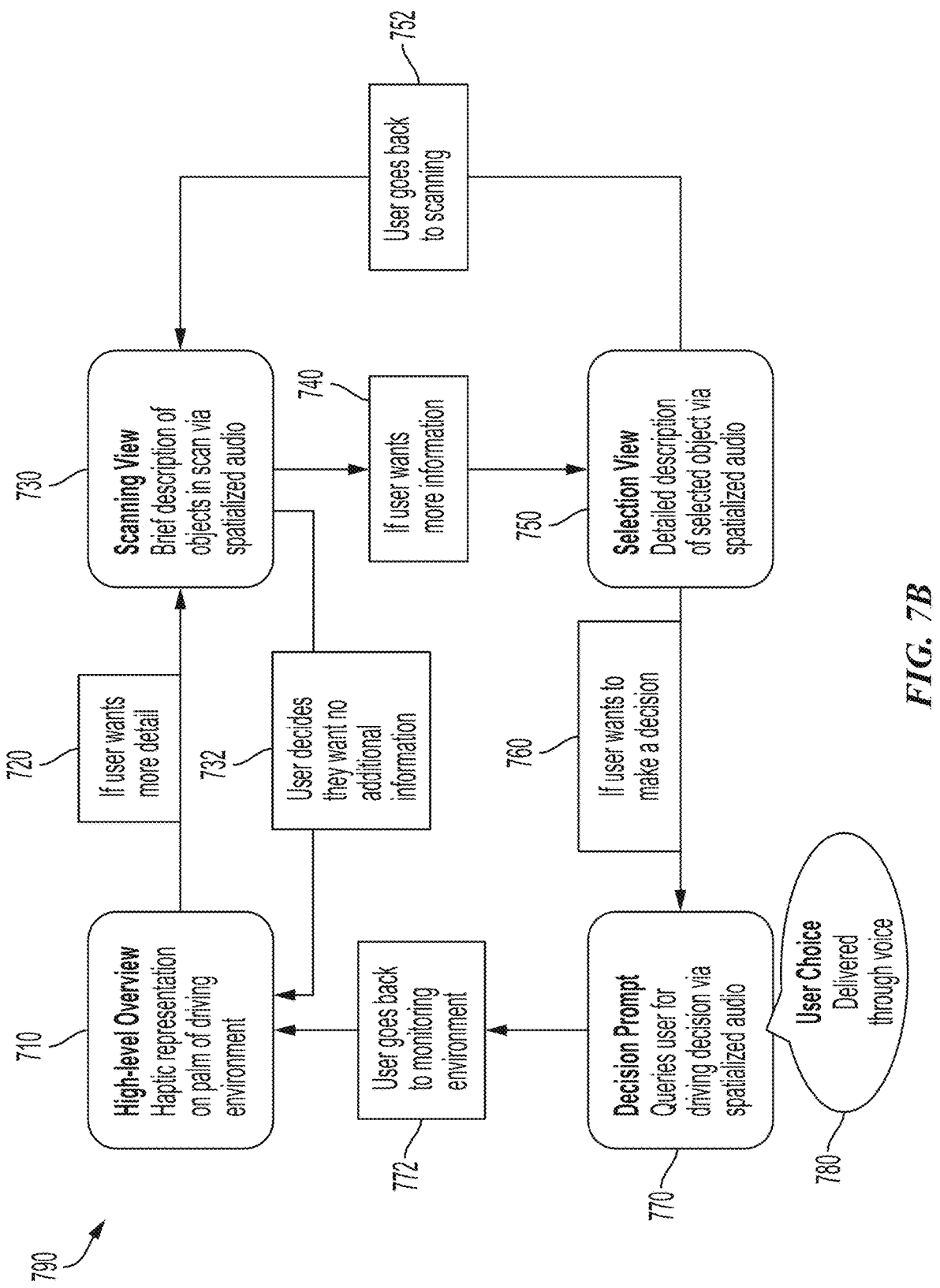

FIGS. 7A, 7B, and 8 are flowcharts illustrating methods for a multisensory gestural-audio interface system, according to aspects of the present disclosure. A method 700 is described in combination with the set of hand gestures shown in FIGS. 8A and 8B and the flowchart of a method 900 of FIG. 9, according to aspects of the present disclosure. The method 700 begins at block 710, in which a high-level overview of a driving environment is provided to a driver of a vehicle through non-visual communication, as shown in block 902 of FIG. 9. For example, as shown in FIG. 6B, the mid-air ultrasonic haptics device 650 provides a haptic component of the multisensory gestural-audio interface system 600 of FIG. 6A by relying on ultrasonic haptic feedback. The mid-air ultrasonic haptics device 650 provides a high-level overview of a driving situation (e.g., an intersection) via a haptic representation on the driver's palm using an array of ultrasonic transducers (e.g., the UH device 670 of FIG. 6B).

Figure 8A:
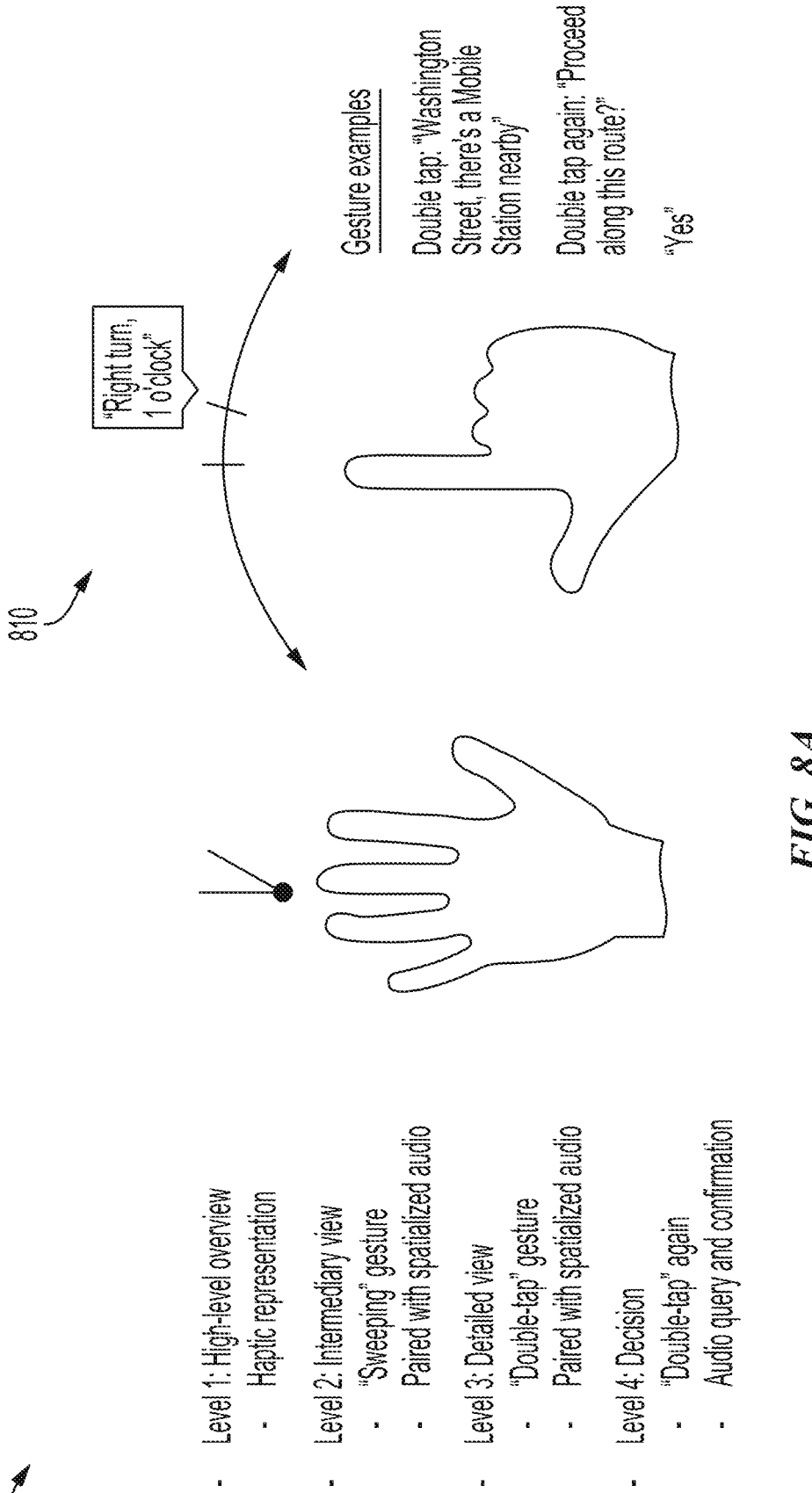
FIGS. 8A and 8B are diagrams illustrating a set of hand gestures for selecting a vehicle object and/or a vehicle control action, according to aspects of the present disclosure.

At block 720, a vehicle cabin is scanned to detect a scanning gesture of the driver in response to the non-visual, high-level overview of the driving environment, as shown in block 904 of FIG. 9. At block 730, gestural-audio scanning view provides a second level (e.g., an intermediary view), such as a brief description of vehicle control objects. For example, as shown in FIG. 6A, the multisensory gestural-audio interface system 600, using computer vision and hand tracking, pairs the driving environment covering information being presented haptically using the mid-air ultrasonic haptics device 650 with recognition of the user's gestural input to provide additional information via spatialized audio cues. For example, as shown in FIG. 8A, when a user engages in a sweeping behavior with their hand 810 from 0 to 180 degrees, each road being represented is delivered via surround-sound speakers mounted in the vehicle cabin (e.g., "a right turn at 1 o'clock"), referred to as the intermediary or scanning view. The scanning view provides a detailed view, which may be triggered using a double-tap gesture paired with spatialized audio. As shown in FIG. 7B, control may flow back to block 710 if the driver desired additional information at block 732.

Figure 8B:
Figure 8B:
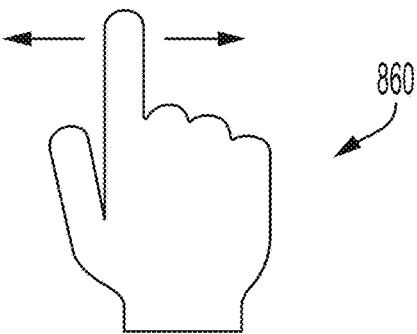
Figure 8B:
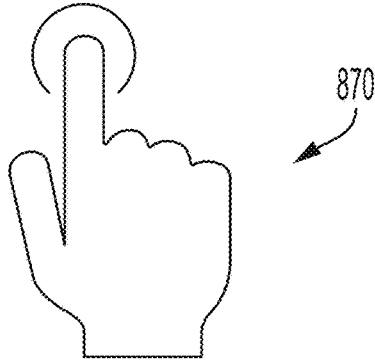
Figure 8B:
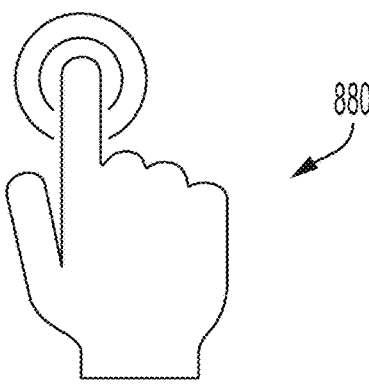

Referring again to FIG. 7A, at block 740, a selection gesture block is shown, to trigger a gestural-audio selection view at block 750. If a user performs a separate gesture at an object, for instance by performing a tapping motion (e.g., as shown in FIG. 8B), the driver receives a more detailed description of the object (e.g., "Washington St. A convenience store is nearby."), referred to as the selection view. In the section view, a detailed description of the selected object is provided to the driver via spatialized audio, for example, using the ring 610 of the set of the speakers 620 (620-1, . . . , 620-7) shown in FIG. 6A. In some aspects of the present disclosure, a non-visual description of a selected vehicle control object is provided according to a detected gesture of the driver, as shown in block 906 of FIG. 9. As shown in FIG. 7B, control may flow back to block 730 if the driver decides to return to the scanning view.

Referring again to FIG. 7A, at block 760, a decision gesture block is shown. At block 770, a gestural-audio decision prompt provides a top level of the multisensory gestural-audio interface system. At block 770, if the driver performs a confirmation gesture (e.g., a double-tap), the user is presented with a decision prompt (e.g., "Proceed down Washington St.?"), to which the driver may respond "yes" or "no" to proceed along this route with a "yes" response. For example, FIG. 8B illustrates gesture examples 850. In a first example, if the driver desires additional details regarding a vehicle object/action, the driver performs a scanning gesture 860. In a second example, if the driver desires more information, the driver performs a selection gesture 870 In a third example, if the driver desires to make a decision, the driver performs a decision gesture 880, such as a double-tap.

Referring again to FIG. 7A, at block 780, the driver's choice is delivered through voice by providing an audio description of, for example, a selected vehicle control action. In some aspects of the present disclosure, subsequent to block 780, a vehicle control action is performed based on the selected vehicle control action in response to a confirmation from the driver to perform the selected vehicle control action, as shown in block 908 of FIG. 9. For example, as shown in FIG. 8A, the driver may perform a hand gesture at 1 o'clock to perform a "right turn" at an upcoming intersection. As shown in FIG. 3, the vehicle control action module 318 is configured to perform a vehicle control action of the car 350 based on the selected vehicle control action in response to a gesture confirmation from the driver of the car 350 to perform the vehicle control action. In some aspects of the present disclosure, overriding of the selected vehicle control action is performed if the selected vehicle control action may result in a collision of the car 350 with an external road agent detected in a surrounding scene of the car 350.

In some aspects of the present disclosure, the method shown in FIGS. 7A and 7B may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102), and/or other components included therein of the vehicle 150, the multisensory gestural-audio interface system 300, or the multisensory gestural-audio interface system 600.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a multisensory gestural-audio interface system, the method comprising:

providing a haptic intersection representation of a driving environment to a driver of an ego vehicle through a haptics device by pulsing N-times at a center of a driver's palm to indicate a number of roads, drawing a line from the center of the palm toward a direction of a clock face position of a road, pulsing at an end of the line and repeating the haptic intersection representation until the driver responds;

scanning, through a multisensory gestural-audio interface device, a vehicle cabin to detect a gesture of the driver in response to the haptic intersection representation of the driving environment;

providing, through a surrounding ring of speakers of the multisensory gestural-audio interface device, a non-visual, spatial audio description of a selected vehicle control object according to the detected gesture of the driver; and performing a vehicle control action based on the selected vehicle control object based on a confirmation from the driver to perform the vehicle control action.

2. The method of claim 1, in which scanning the vehicle cabin comprises tracking gestures of the driver to detect a scanning gesture.

3. The method of claim 1, further comprising providing a brief description of vehicle control objects in a scanning view using spatialized audio.

4. The method of claim 1, further comprising querying the driver to confirm the vehicle control action.

5. The method of claim 1, in which scanning the vehicle cabin comprises identifying a hand gesture of the driver.

6. The method of claim 1, in which providing the non-visual description further comprises playing an audio description of the vehicle control action.

7. The method of claim 1, further comprising overriding the vehicle control action if the vehicle control action may result in a collision of the ego vehicle with an external road agent detected in a surrounding scene of the ego vehicle.

8. A non-transitory computer-readable medium having program code recorded thereon for a multisensory gestural-audio interface system, the program code being executed by a processor and comprising:

program code to provide a haptic intersection representation of a driving environment to a driver of an ego vehicle through a haptics device by pulsing N-times at a center of a driver's palm to indicate N-roads, drawing a line from the center of the palm toward a direction of a clock face position of a road, pulsing at an end of the line and repeating the haptic intersection representation until the driver responds;

program code to scan, through a multisensory gestural-audio interface device, a vehicle cabin to detect a gesture of the driver in response to the haptic intersection representation of the driving environment;

program code to provide, through a surrounding ring of speakers of the multisensory gestural-audio interface device, a non-visual, spatial audio description of a selected vehicle control object according to the detected gesture of the driver; and program code to perform a vehicle control action based on the selected vehicle control object based on a confirmation from the driver to perform the vehicle control action.

9. The non-transitory computer-readable medium of claim 8, in which the program code to scan the vehicle cabin comprises program code to track gestures of the driver to detect a scanning gesture.

10. The non-transitory computer-readable medium of claim 8, further comprising program code to provide a brief description of vehicle control objects in a scanning view using spatialized audio.

11. The non-transitory computer-readable medium of claim 8, further comprising program code to query the driver to confirm the vehicle control action.

12. The non-transitory computer-readable medium of claim 8, in which the program code to scan the vehicle cabin comprises program code to identify a hand gesture of the driver.

13. The non-transitory computer-readable medium of claim 8, in which the program code to provide the non-visual description further comprises program code to play an audio description of the vehicle control action.

14. The non-transitory computer-readable medium of claim 8, further comprising program code to override the vehicle control action if the vehicle control action may result in a collision of the ego vehicle with an external road agent detected in a surrounding scene of the ego vehicle.

15. A system for a multisensory gestural-audio interface system, the system comprising:

a non-visual environment overview module to provide a haptic intersection representation of a driving environment to a driver of an ego vehicle through a haptics device by pulsing N-times at a center of a driver's palm to indicate N-roads, drawing a line from the center of the palm toward a direction of a clock face position of a road, pulsing at an end of the line and repeating the haptic intersection representation until the driver responds;

a gesture tracking module to scan a vehicle cabin to detect a gesture of the driver in response to the haptic intersection representation of the driving environment;

a vehicle control selection module to provide, through a surrounding ring of speakers of the multisensory gestural-audio interface device, a non-visual, spatial audio description of a selected vehicle control object according to the detected gesture of the driver; and a vehicle control action module to perform a vehicle control action based on the selected vehicle control object based on a confirmation from the driver to perform the vehicle control action.

16. The system of claim 15, in which the gesture tracking module is further to track gestures of the driver to detect a scanning gesture.

17. The system of claim 15, in which the gesture tracking module is further to identify a hand gesture of the driver.

* * * * *